United States Patent
Wang et al.

(10) Patent No.: US 7,656,057 B2
(45) Date of Patent: Feb. 2, 2010

(54) POWER CONDITIONER AND METHOD OF OPERATING THE SAME

(75) Inventors: Yong Wang, Yongin-si (KR); Duk-Jin Oh, Seoul (KR); See-young Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 11/860,768

(22) Filed: Sep. 25, 2007

(65) Prior Publication Data

US 2008/0259660 A1 Oct. 23, 2008

(30) Foreign Application Priority Data

Apr. 23, 2007 (KR) .................... 10-2007-0039440

(51) Int. Cl.
*H02J 9/00* (2006.01)
*H01M 8/12* (2006.01)

(52) U.S. Cl. ............................... 307/64; 429/23

(58) Field of Classification Search .......... 307/82, 307/64; 429/23, 22
See application file for complete search history.

(56) References Cited

U.S. PATENT DOCUMENTS

| 6,881,509 B2* | 4/2005 | Jungreis | 429/23 |
| 7,449,259 B2* | 11/2008 | Zhu et al. | 429/23 |
| 2004/0217732 A1 | 11/2004 | Zhu et al. | |
| 2004/0219399 A1 | 11/2004 | Zhu et al. | |
| 2007/0128482 A1* | 6/2007 | Gu et al. | 429/22 |

FOREIGN PATENT DOCUMENTS

JP 2003-243011 8/2003

OTHER PUBLICATIONS

Office Action issued in corresponding Korean Patent Application No. 2007-39440 dated Oct. 30, 2008.

* cited by examiner

*Primary Examiner*—Albert W Paladini
*Assistant Examiner*—Michael Rutland Wallis
(74) *Attorney, Agent, or Firm*—Stein McEwen, LLP

(57) ABSTRACT

A power conditioner for supplying controlled power generated from a power source such as a fuel cell or a solar battery to a load. The power conditioner includes a main converter converting the output voltage of the power source; an auxiliary converter converting the output voltage of the main converter to a voltage that is supplied to BOP elements; and a direct connecting line connecting the output voltage of the power source to the auxiliary converter bypassing the main converter. Accordingly, because the voltage for the power to be supplied to the BOP elements is converted only once, the power loss can be significantly reduced compared to the power loss from a conventional power conditioner.

9 Claims, 6 Drawing Sheets

POWER CONDITIONER AND METHOD OF OPERATING THE SAME

CROSS-REFERENCE TO RELATED APPLICATION

This application claims the benefit of Korean Application No. 2007-39440, filed Apr. 23, 2007 in the Korean Intellectual Property Office, the disclosure of which is incorporated herein by reference.

BACKGROUND OF THE INVENTION

1. Field of the Invention

Aspects of the present invention relate to a power conditioner for supplying controlled power generated from a fuel cell, a solar battery, or the like to a load, and a method of operating the power conditioner.

2. Description of the Related Art

Power generated from a fuel cell 10 is supplied to a load 40 through a power conditioner as illustrated in FIG. 1. FIG. 1 is specifically a diagram illustrating the structure of a power conditioner disclosed in U.S. Patent Publication No. 2004/0219399. A DC voltage in the range of about 40 V-50 V generated in the fuel cell 10, which is a power source, is raised to a DC voltage in the range of about 360 V-400 V in a main converter 20. The fuel cell 10 includes a plurality of stacked unit cells. Thus, the power outputs generated in each unit cell are added, such that the output voltage of the fuel cell 10 is in the range of 40 V-50 V DC. The DC voltage is raised in the main converter 20, is converted to an AC voltage in an inverter 30, and is supplied to the load 40.

At this point, between the main converter 20 and the inverter 30, power corresponding to a DC voltage is reduced to about 20 V-30 V through an auxiliary converter 60 and is used to operate various components (such as a blower, a motor, a cooling fan, and a controller) that are incorporated into the stack of the fuel cell 10, and to operate controllers such as the main converter 20 and the inverter 30. That is, a part of the power that had been raised to a predetermined voltage in the main converter 20 is diverted to the auxiliary converter 60, reduced to an appropriate voltage, and is then supplied to the various components and controllers. Of course, the output voltage of the auxiliary converter 60 is also supplied to a controller of the auxiliary converter 60. The elements of a system that uses a part of the power generated in the fuel cell 10, for example, the controller that controls the main converter 20, the inverter 30, the auxiliary converter 60, etc., and the various components included in the stack of the fuel cell 10 are generally referred to as balance of plant (BOP) elements. In FIG. 1, the elements are shown as a single BOP elements 70. A storage battery 50 is also used as a power source when power is not adequately supplied to the auxiliary converter 60, such as in the initial start mode of the fuel cell 10. The storage battery 50 is charged by the output voltage of the main converter 20 while the fuel cell 10 operates normally. The charged storage battery 50 is used as the power source of the auxiliary converter 60 in the initial start mode.

However, in the architecture illustrated in FIG. 1, the voltage supplied to the BOP elements 70 must pass through both the main converter 20 and the auxiliary converter 60, and accordingly an unavoidable power loss occurs at two points during the voltage conversion process. That is, power loss occurs when part of the power is changed into heat during the voltage conversion (i.e., increase) process in the main converter 20 and then again during the reverse conversion (i.e., decrease) in the auxiliary converter 60. As a result, power supplied to the BOP elements 70 after passing through the converters 20 and 60 is the power remaining after the power output from the fuel cell 10 has been greatly reduced. To lessen the loss of power, a part of the power supplied from the fuel cell 10 could be directly supplied to the BOP elements 70 without passing through the converters 20 and 60. However, since the output voltage of the fuel cell 10 varies as a function of the operating conditions of the load 40, the output voltage of the fuel cell 10 also varies considerably. Accordingly, it is not possible to use this bypass system when power is directly supplied to the BOP elements 70 because the operating conditions of the entire system become unstable.

Therefore, in order to solve these and/or other problems, there is a need to develop an apparatus and method that avoids the power loss by decreasing the number of times of voltage conversions while supplying stable power to BOP elements 70.

SUMMARY OF THE INVENTION

Aspects of the present invention provide an improved power conditioner that can reduce a loss of power associated with supplying power to BOP elements and can also stably supply power to the BOP elements, as well as a method of operating the power conditioner.

An aspect of the present invention provides a power conditioner including: a main converter to convert the output voltage of a power source (primary voltage conversion); an auxiliary converter to convert the output voltage of the main converter to a voltage that can be supplied to BOP elements, which include operation of the power source (secondary voltage conversion); and a direct connecting line to connect the output voltage of the power source to the auxiliary converter and bypass the main converter.

The power conditioner may further include ON/OFF switches respectively disposed in a line to supply a voltage to the auxiliary converter via the direct connecting line and in a line to supply a voltage to the auxiliary converter via the main converter, and a controller operating the ON/OFF switches of the two lines so that the two lines can be used one at a time, as appropriate.

A storage battery may be disposed between the main converter and the auxiliary converter so that the output voltage of the main converter is reduced when passing through the storage battery and the reduced output voltage is supplied to the auxiliary converter.

An inverter converting a DC voltage into an AC voltage may be disposed between the main converter and a load. The power source may be either a fuel cell or a solar battery.

Another aspect of the present invention provides a method of operating a power conditioner that includes a main converter converting an output voltage of a power source to a voltage suitable to be supplied to a load, a storage battery charged with the output voltage of the main converter, an auxiliary converter converting the output voltage of the power source or the storage battery voltage into a voltage suitable to be supplied to BOP elements, a direct connecting line connecting the power source to the auxiliary converter bypassing the storage battery, a line connecting the main converter and the storage battery to the auxiliary converter, a first ON/OFF switch disposed in the direct connecting line, a second ON/OFF switch disposed in the line connecting the main converter and the storage battery to the auxiliary converter, and a controller operating the first and second ON/OFF switches; where the method includes turning on the power source; operating the second ON/OFF switch to supply power from the storage battery to the auxiliary converter when the output voltage of the power source has not reached a predetermined level; and operating the first ON/OFF switch to supply power to the auxiliary converter and bypassing the main converter, when the output voltage of the power source has reached the predetermined level.

The method may further include: shutting down the system including the power source; and supplying residual power of the power source to the BOP elements via the auxiliary converter by the controller operating the first ON/OFF switch, therefore bypassing the main converter.

The power source may be either a fuel cell or a solar battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
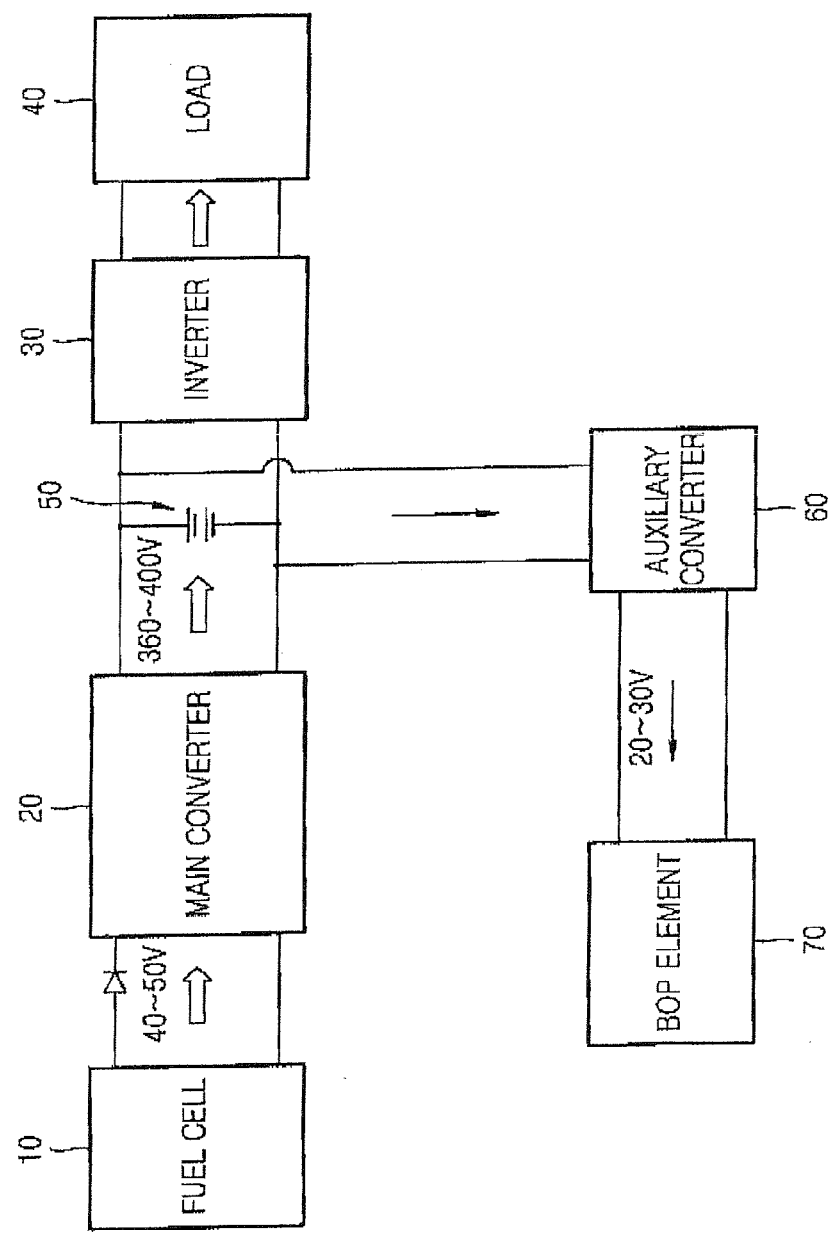
FIG. 1 is a block diagram illustrating a conventional (prior art) power conditioner.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
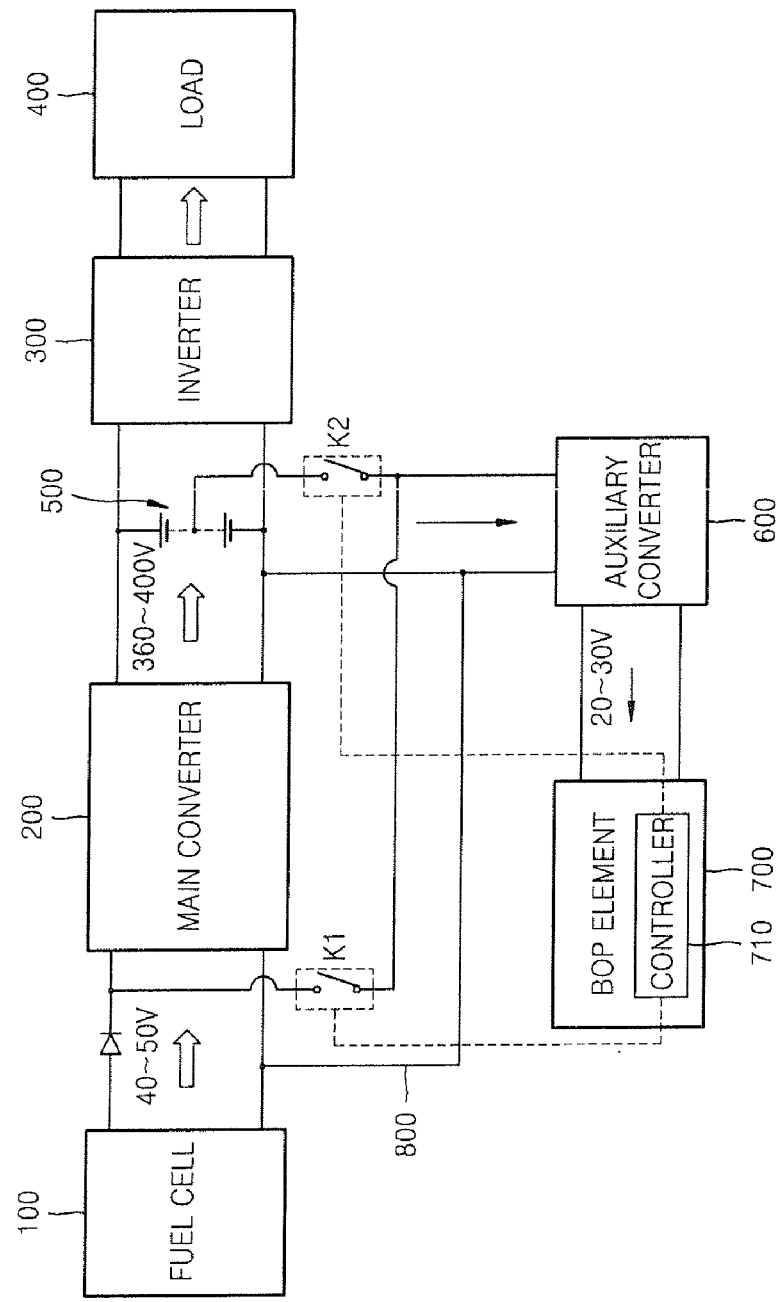
FIG. 2 is a block diagram illustrating the structure of a power conditioner according to an embodiment of the present invention.

FIG. 2 is a block diagram illustrating a power conditioner according to an embodiment of the present invention. The power conditioner has a basic structure in which a DC output voltage of a power source such as a fuel cell (i.e., fuel cell stack) 100 is raised in a main converter 200, is then converted to an AC voltage in an inverter 300, and is supplied to a load 400. A controller 710 controls the main converter 200, an auxiliary converter 600, the inverter 300, and ON/OFF switches K1 and K2, which will be described below.

In this aspect of the present invention, a voltage is supplied to BOP elements 700 via the main converter 200 and a storage battery 500 through the auxiliary converter 600, or the output voltage of the fuel cell 100 is directly supplied to the auxiliary converter 600 to be subsequently supplied to the BOP elements 700. That is, in the first case, an output voltage in the range of 40 V-50 V from the fuel cell 100 is raised to a voltage in the range of 360 V-400 V in the main converter 200. The storage battery 500 is charged by the output voltage from the main converter 200. If necessary, the voltage of the charged storage battery 500 is reduced when passing through the auxiliary converter 600, such as during the initial start mode of the fuel cell 100, and supplied to the BOP elements 700. In the second case, the output voltage of the fuel cell 100 is directly supplied to the auxiliary converter 600 through a direct connecting line 800 during normal operation of the fuel cell 100, that is, except during the initial start mode. Accordingly, since the voltage supplied to the BOP elements 700 undergoes only one voltage conversion, that is, the voltage conversion process of the auxiliary converter 600, power loss in the voltage conversion process is reduced. Consequently, power loss can be greatly reduced. However, in the case of the initial start mode, when the fuel cell 100, which is a power source, does not yet generate power, the supply of power to the BOP elements 700 through the direct connecting line 800 is not adequate. Accordingly, at this point, the power charged in the storage battery 500, as described above, is supplied to the BOP elements 700 via the auxiliary converter 600. The ON/OFF switch K1 and the ON/OFF switch K2 are controlled by the controller 710 and used to select either the case in which the power to be supplied to the auxiliary converter 600 passes through the direct connecting line 800 or the case in which the power to be supplied to the auxiliary converter 600 passes through the storage battery 500. Because the voltage supplied to the auxiliary converter 600 through the direct connecting line 800 from the fuel cell 100 is about 40 V-50 V, and on the other hand, the output voltage from the main converter 200 is several hundreds of volts, the differential between the two voltages should be reduced to more easily accommodate the capacity of the auxiliary converter 600. Accordingly, a voltage drawing unit may be disposed in the storage battery 500, as shown in FIG. 2, so that a reduced voltage, rather than the entire voltage charged in the storage battery 500, can be supplied to the auxiliary converter 600.

Figure 3A:
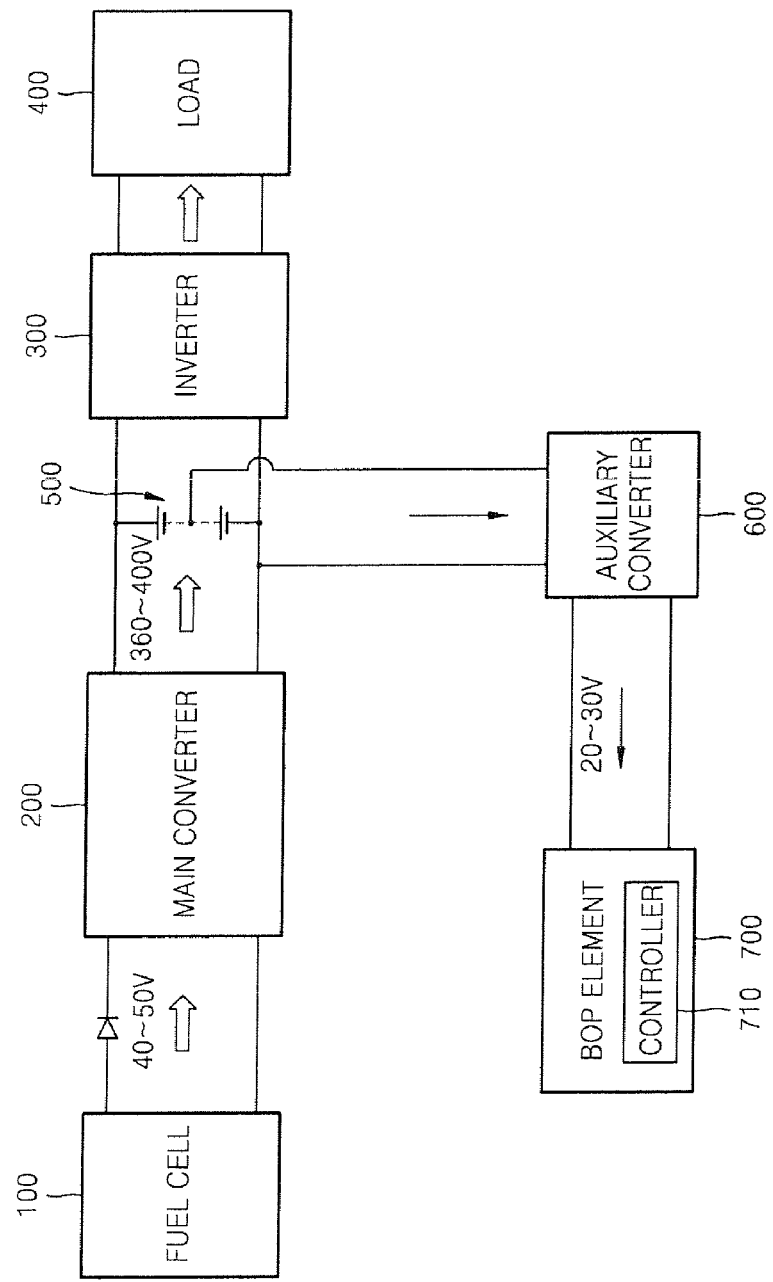
FIG. 3A is an equivalent circuit diagram where the power conditioner of FIG. 2 selects a switch during an initial start mode of a power source.
Figure 4:
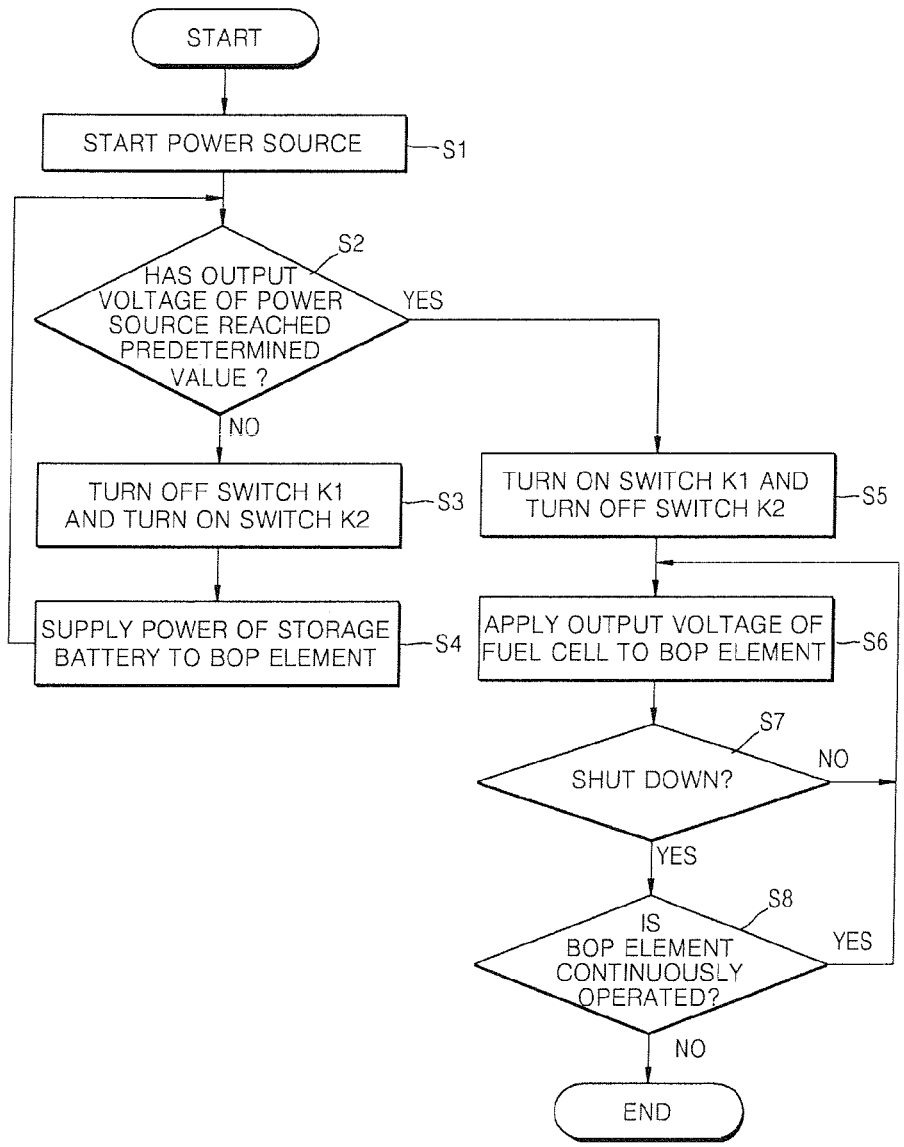
FIG. 4 is a flow chart illustrating a method of operating of the power conditioner of FIG. 2.

The power conditioner having the above structure may be operated as shown in the flowchart of FIG. 4, according to this embodiment of the present invention. First of all, the fuel cell 100, which is a power source, starts to operate (S1). However, in such an initial start mode, the normal output voltage of the fuel cell 100 cannot yet be produced from the fuel cell 100. Accordingly, the normal output voltage of the fuel cell 100 cannot be applied to the auxiliary converter 600 through the direct connecting line 800. At this point, the output voltage of the fuel cell 100 is measured by a voltage sensor (not shown) built in the main converter 200. The voltage sensor determines whether the output voltage of the fuel cell 100 has reached a predetermined level (operation S2). If the output voltage of the fuel cell 100 has not reached the predetermined level, the controller 710 switches off the switch K1 and switches on the switch K2 (operation S3). Then, power charged in the storage battery 500 is supplied to the BOP elements 700 via the auxiliary converter 600 (operation S4). FIG. 3A is an equivalent circuit diagram illustrating this situation of switch selection. That is, the power conditioner is operated by using power charged in the storage battery 500 until the fuel cell 100 reaches the normal operating state of output voltage having a stable predetermined level.

Figure 3B:
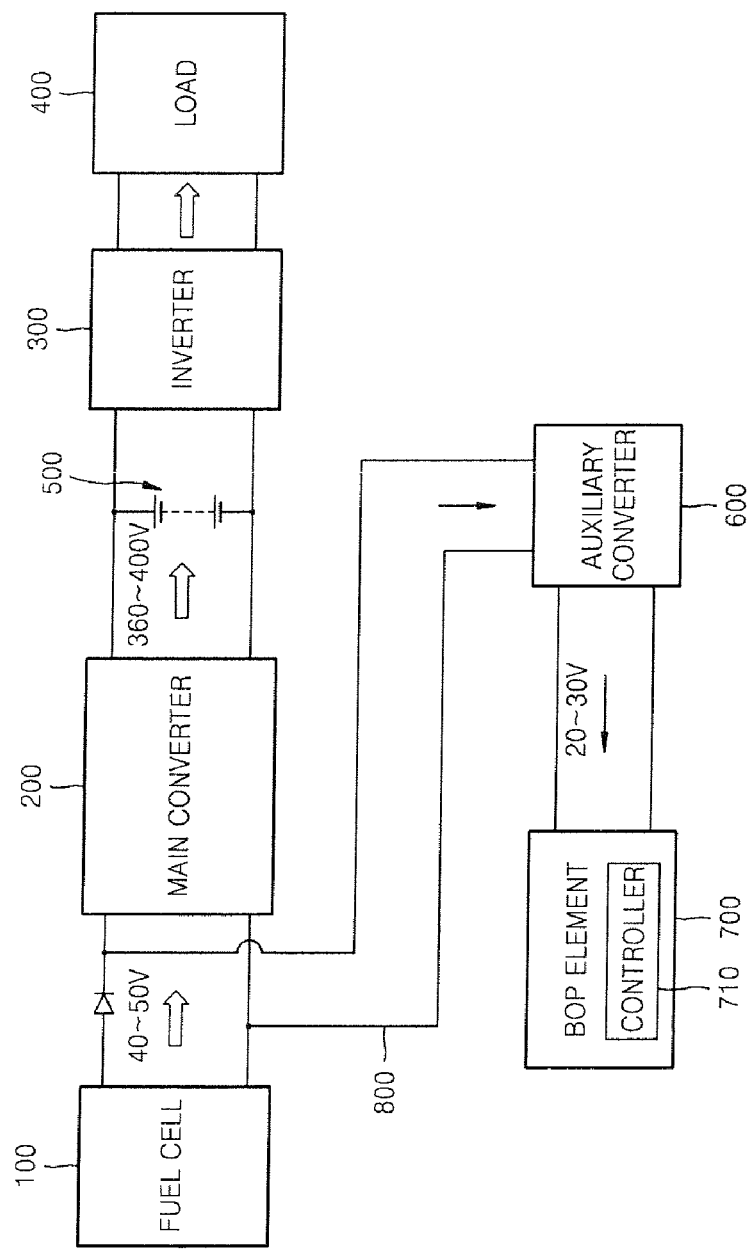
FIG. 3B is an equivalent circuit diagram where the power conditioner of FIG. 2 selects a switch during normal operation of the power source.

Subsequently, when a stable output voltage is achieved in the fuel cell 100, the switch K1 is switched on and the switch K2 is switched off (operation S5). As illustrated in the equivalent circuit diagram of FIG. 3B, the output voltage of the fuel cell 100 is directly supplied to the auxiliary converter 600 along the direct connecting line 800 (operation S6). That is, from this point on, since the output voltage of the fuel cell 100 reached the predetermined level, the voltage is supplied to the auxiliary converter 600 through the direct connecting line 800. Accordingly, since voltage passing only through the auxiliary converter 600 is supplied to the BOP elements 700, power loss can be significantly reduced compared to a conventional power conditioner in which a voltage passes through two voltage conversion processes before reaching the BOP elements 700.

Also, at some point, the entire system including the fuel cell 100 enters into a shut-down mode (operation S7). At this point, some of the BOP elements 700 should be operated continuously for a predetermined period of time (operation S8). However, at this point, because of residual power stored in the fuel cell 100, the voltage can be supplied to the BOP elements 700 through the direct connecting line 800 and the auxiliary converter 600 using the residual power of the fuel cell 100 similar to the case of a normal operation. Of course, in this case, the on state of the ON/OFF switch K1 and the off state of the ON/OFF switch K2 are maintained by the controller 710.

Accordingly, the power conditioner of this aspect of the invention is capable of preventing power loss by implementing a voltage conversion process only once when power is supplied to the BOP elements 700.

Figure 5:
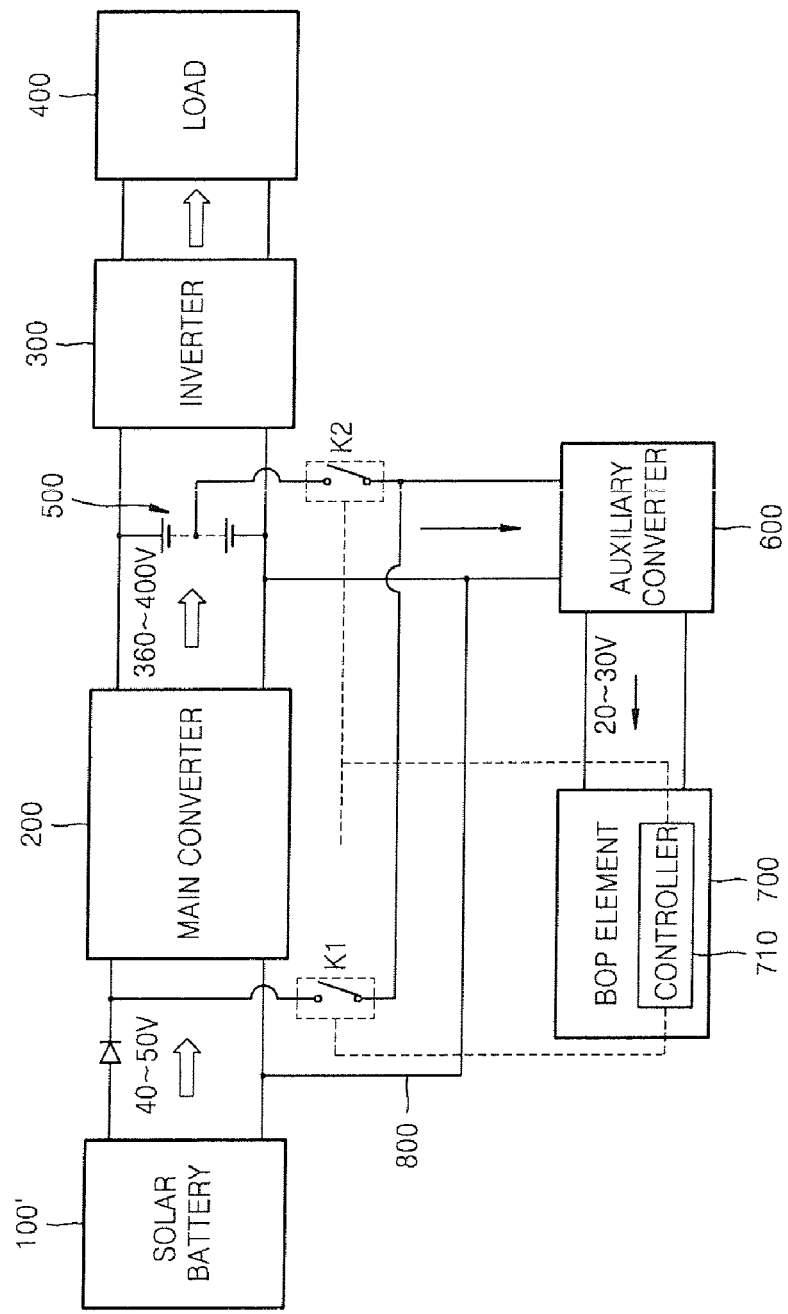
FIG. 5 is a block diagram illustrating the structure of a power conditioner according to another embodiment of the present invention.

In the foregoing embodiment, a fuel cell is illustrated as a power source, but, for example, a solar battery can be also used as the power source with a power conditioner having the same structure as described above. FIG. 5 is a block diagram illustrating a structure of a power conditioner when a solar battery 100' is used as the power source. In the initial start mode, the output voltage of the solar battery 100' is not adequate, similar to the case of the fuel cell 100 described above. Therefore, until the solar battery 100' reaches the normal operation state, the power of the storage battery 500 is supplied to the BOP elements 700 by operation of controller 710 operating the ON/OFF switch K1 and the ON/OFF switch K2 in similar fashion to the fuel cell embodiment, that is switch K2 is turned on and switch K1 is turned off. When the output voltage has reached the predetermined level, the output voltage of the solar battery 100' is supplied to the BOP elements 700 via the auxiliary converter 600 through the direct connecting line 800 by alternate operation of controller 710 so that the ON/OFF switch K1 is turned on and the ON/OFF switch K2 is turned off. The construction and operation of the power conditioner are the same as those of the previous embodiments, except that solar battery 100' is used as the power source.

As described above, the power conditioner according to these aspects of the present invention has the following advantages. First, since the voltage to be supplied to BOP elements passes through a voltage conversion process only once, power loss can be significantly reduced compared to a conventional power conditioner. Second, since the output voltage of a power source is not directly supplied to BOP elements but passes through an auxiliary converter, a stable voltage can be supplied to the BOP elements that does not vary by extreme amounts as a function of the load on the auxiliary converter.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power conditioner comprising:
 a main converter converting the output voltage of a power source;
 an auxiliary converter converting the output voltage of the main converter to a voltage that is supplied to basic operating plant elements that incorporate operating components of the power source;
 a direct connecting line connecting the output voltage of the power source to the auxiliary converter and bypassing the main converter;
 a first ON/OFF switch disposed in the direct connecting line;
 a second ON/OFF switch disposed in a line connecting the auxiliary converter to the main converter; and
 a controller operating the first and second ON/OFF switches such that the direct connecting line and the line connecting the auxiliary converter to the main converter are operated one at a time.

2. The power conditioner of claim 1, further comprising a storage battery disposed between the main converter and the auxiliary converter.

3. The power conditioner of claim 2, wherein the output voltage of the main converter is reduced when passing through the storage battery and the reduced output voltage is supplied to the auxiliary converter.

4. The power conditioner of claim 1, further comprising an inverter converting a DC voltage into an AC voltage is disposed between the main converter and a load.

5. The power conditioner of claim 1, wherein the power source is a fuel cell or a solar battery.

6. A method of operating a power conditioner comprising a main converter converting an output voltage of a power source to a voltage suitable to be supplied to a load, a storage battery charged with the output voltage of the main converter, an auxiliary converter converting the output voltage of the power source or the storage battery voltage to a voltage suitable to be supplied to basic operating plant (BOP) elements, a direct connecting line connecting the power source to the auxiliary converter, a line connecting the main converter and the storage battery to the auxiliary converter, a first ON/OFF switch disposed in the direct connecting line, a second ON/OFF switch disposed in the line connecting the main converter and the storage battery to the auxiliary converter, and a controller operating the first and second ON/OFF switches, the method comprising:
 turning on the power source;
 operating the second ON/OFF switch to supply power from the storage battery to the auxiliary converter when the output voltage of the power source has not reached a predetermined level; and
 operating the first ON/OFF switch to supply power to the auxiliary converter and bypassing the main converter, when the output voltage of the power source has reached the predetermined level.

7. The method of claim 6, further comprising:
 shutting down the power conditioner; and
 operating the first ON/OFF switch to supply residual power from the power source to the auxiliary converter when the BOP elements are needed to operate in the shut-down mode.

8. The method of claim 6, wherein the power source is a fuel cell or a solar battery.

9. A power conditioner comprising:
 a main converter converting the output voltage of a power source;
 an auxiliary converter converting the output voltage of the main converter to a voltage that is supplied to basic operating plant (BOP) elements that incorporate operating components of the power source;
 a direct connecting line connecting the output voltage of the power source to the auxiliary converter and bypassing the main converter;
 a first ON/OFF switch disposed in the direct connecting line;
 a second ON/OFF switch disposed in a line connecting the auxiliary converter to the main converter; and
 a controller operating the first and second ON/OFF switches such that the direct connecting line and the line connecting the auxiliary converter to the main converter are operated one at a time,
 wherein the power conditioner reduces power loss from conversion of voltage to the BOP elements and ensures stable operation of the BOP elements.

* * * * *